(12) United States Patent
Senga et al.

(10) Patent No.: US 7,697,400 B2
(45) Date of Patent: Apr. 13, 2010

(54) OPTICAL PICKUP AND OPTICAL DISC DEVICE

(75) Inventors: Hisashi Senga, Osaka (JP); Tomotada Kamei, Osaka (JP); Kenzo Ishibashi, Osaka (JP); Hideki Hayashi, Nara (JP); Yohichi Saitoh, Osaka (JP)

(73) Assignee: Panasonic Corporation, Kadoma (JP)

( * ) Notice: Subject to any disclaimer, the term of this patent is extended or adjusted under 35 U.S.C. 154(b) by 411 days.

(21) Appl. No.: 11/816,426

(22) PCT Filed: Feb. 17, 2006

(86) PCT No.: PCT/JP2006/302871
§ 371 (c)(1), (2), (4) Date: Aug. 16, 2007

(87) PCT Pub. No.: WO2006/088153
PCT Pub. Date: Aug. 24, 2006

(65) Prior Publication Data
US 2009/0052492 A1      Feb. 26, 2009

(30) Foreign Application Priority Data
Feb. 21, 2005   (JP)   ............... 2005-043703
Mar. 16, 2005   (JP)   ............... 2005-074597

(51) Int. Cl.
G11B 7/125   (2006.01)
(52) U.S. Cl. ............ 369/121; 369/122; 369/244.1
(58) Field of Classification Search ............... None
See application file for complete search history.

(56) References Cited
U.S. PATENT DOCUMENTS
5,936,929 A * 8/1999 Jiang et al. ............... 369/121

7,161,890 B2 * 1/2007 Komma et al. ........ 369/112.07
2002/0048249 A1   4/2002 Mori et al.

(Continued)

FOREIGN PATENT DOCUMENTS
JP   2002-203332   7/2002

(Continued)

OTHER PUBLICATIONS

Supplementary European Search Report issued on Aug. 21, 2008 for corresponding European Patent Application No. 06714012.9.
International Search Report for corresponding Application No. PCT/JP2006/302871 mailed Mar. 14, 2006.

*Primary Examiner*—Joseph H Feild
*Assistant Examiner*—Tawfik Goma
(74) *Attorney, Agent, or Firm*—Renner, Otto, Boisselle & Sklar, LLP

(57) ABSTRACT

An optical pickup according to the present invention includes an integrated circuit element (LDD) 5 for driving first, second, and third semiconductor lasers 3, 4, and 5. The LDD 50 is shaped so as to have a rectangular principal face surrounded by one side, with a plurality of input/output pins being arranged along each side. The plurality of input/output pins include a first pin group connected to a blue-violet laser 5 whose oscillation wavelength is the shortest, a second pin group connected to a red laser 4, and a third pin group connected to an infrared laser 3. The wiring structure of the optical pickup includes a first transmission line 41 for connecting the first pin group to the blue-violet laser 5, a second transmission line 33 for connecting the second pin group to the red laser 4, and a third transmission line 31 for connecting the third pin group to the infrared laser 3, where the first transmission line 41 is shorter than both the second and third transmission lines 31 and 33. Of the rectangular principal face of the LDD 50, the side along which the first pin group is provided is orthogonal to the side along which the second pin group is provided or to the side along which the third pin group is provided.

8 Claims, 10 Drawing Sheets

| U.S. PATENT DOCUMENTS | | | | JP | 2003-151159 | 5/2003 |
|---|---|---|---|---|---|---|
| 2002/0136135 A1 | 9/2002 | Momoo et al. | | JP | 2004-139668 | 5/2004 |
| 2003/0086356 A1 | 5/2003 | Uchiyama et al. | | JP | 2004-039034 | 2/2005 |
| 2003/0107980 A1 | 6/2003 | Shih et al. | | JP | 2005-259285 | 9/2005 |
| 2004/0047273 A1 | 3/2004 | Kitano | | WO | 2007/049535 | 5/2007 |

FOREIGN PATENT DOCUMENTS

| JP | 2002-230812 | 8/2002 |
|---|---|---|

\* cited by examiner (a)

(b)

(c)

(a)

First Layer (Signal Line): Copper Foil
Intermediate Layer: Base Film (Dielectric Constant $\varepsilon$)
Second Layer (GND Line): Copper Foil (b)

First Layer (Signal Line): Copper Foil
Intermediate Layer: Base Film (Dielectric Constant $\varepsilon$)
Second Layer (Power Line): Copper Foil

OPTICAL PICKUP AND OPTICAL DISC DEVICE

TECHNICAL FIELD

The present invention relates to an optical pickup, and an optical disk apparatus having the optical pickup.

BACKGROUND ART

In a recording/reproduction apparatus for optical disks, in order to read data from an optical disk or write data to an optical disk, it is necessary to access a desired position on the optical disk with an optical pickup. An optical pickup includes: a light source for emitting a light beam; an objective lens for converging the light beam onto an optical disk; and photosensitive elements for outputting electrical signals based on the light beam having been reflected from the optical disk.

A semiconductor laser is used as a light source in within the optical pickup. The semiconductor laser operates with a driving current which is supplied from the laser driving circuit, and is able to emit laser light at an intensity which is in accordance with the driving current.

If a portion of the laser light that has been reflected from the optical disk enters the semiconductor laser, the oscillation state of the laser is disturbed, thus resulting in problematic fluctuations of the intensity of laser light. Such fluctuations in laser light intensity that are caused by the returned light are referred to as "return light noise". In order to reduce this return light noise, it is practiced to superpose a high-frequency signal on the driving current for the semiconductor laser so as to cause the semiconductor laser to oscillate in multi modes (high-frequency superposition).

In performing a high-frequency superposition, it has been proposed to employ impedance matching elements to reduce power loss of the high-frequency signal, thus realizing good signal reproduction characteristics (see, for example, Patent Document 1).

[Patent Document 1] Japanese Laid-Open Patent Publication No. 2002-230812

DISCLOSURE OF INVENTION

Problems to be Solved by the Invention

Optical disks which are compatible with digital Hi-Vision, where data recording/reproduction is performed with a blue-violet laser with a wavelength of about 400 nm, have been made into commercial products. For example, optical disks under the Blu-ray Disc standard (BD) have been realized as commercial products, and are drawing attention as high-density optical disks of the next generation. On the other hand, high-density optical disks under the HD-DVD standard are also being developed. In the future, an ability to support such high-density optical disks and the already-prevalent CDs and DVDs both with a single optical disk apparatus will be needed.

However, recording/reproduction for a CD is performed with an infrared laser, whereas recording/reproduction for a DVD is performed with a red laser. Therefore, in order to support recording/reproduction for CDs, DVDs, and next-generation high-density optical disks with a single optical disk apparatus, it is necessary to place three types of semiconductor lasers of different oscillation wavelengths within the optical pickup.

In order to realize downsizing of the optical pickup, it is necessary to operate the three types of semiconductor lasers with a single driving circuit. However, when the three semiconductor lasers are placed away from one another within the optical pickup, driving the three semiconductor lasers with a single laser driving device will result in an elongated total wiring length from the laser driving device to each semiconductor laser. As a result, the high-frequency power losses ascribable to the increased wiring length will not be negligible, and thus sufficient high-frequency characteristics will not be obtained.

The present invention has been made in order to solve the aforementioned conventional problems, and an objective thereof is to provide an optical pickup having excellent high-frequency characteristics.

Another objective of the present invention is to provide an optical disk apparatus having the aforementioned optical pickup.

Means for Solving the Problems

An optical pickup according to the present invention is an optical pickup for performing data recording and reproduction by using a plurality of light beams of different wavelengths, comprising: a first semiconductor laser for emitting a first light beam having a first wavelength; a second semiconductor laser for emitting a second light beam having a second wavelength which is longer than the first wavelength; a third semiconductor laser for emitting a third light beam having a third wavelength which is longer than the second wavelength; at least one objective lens for converging the first, second, and third light beams; an integrated circuit element for driving the first, second, and third semiconductor lasers based on an external signal, the integrated circuit element being shaped so as to have a rectangular principal face surrounded by four sides, with a plurality of input/output pins being arranged along each side, the plurality of input/output pins including a first pin group connected to the first semiconductor laser, a second pin group connected to the second semiconductor laser, and a third pin group connected to the third semiconductor laser; a wiring structure including a first transmission line for connecting the first pin group of the integrated circuit element to the first semiconductor laser, a second transmission line for connecting the second pin group to the second semiconductor laser, and a third transmission line for connecting the third pin group to the third semiconductor laser; and light detection means for generating an electrical signal in response to at least a portion of the first, second, and third light beams reflected from an optical disk, wherein, of the rectangular principal face of the integrated circuit element, the side along which the first pin group is provided is orthogonal to the side along which the second pin group is provided or to the side along which the third pin group is provided, and the first transmission line is shorter than both of the second and third transmission lines.

In a preferred embodiment, the integrated circuit element is positioned so as to be closer to the first semiconductor laser than to the second and third semiconductor lasers.

In a preferred embodiment, the second pin group and third pin group of the integrated circuit element are both provided along one side which is orthogonal to the side along which the first pin group is provided.

In a preferred embodiment, the integrated circuit element is disposed so that a diagonal of the rectangular principal face is oriented substantially parallel to a traveling direction of the optical pickup.

In a preferred embodiment, the first, second, and third light beams are blue-violet laser light, red laser light, and infrared laser light, respectively.

In a preferred embodiment, characteristic impedances of the first, second, and third transmission lines are each prescribed to be a value which is substantially equal to an equivalent serial resistance value of the semiconductor laser connected thereto.

In a preferred embodiment, a flexible cable on which the integrated circuit element is mounted; and other flexible cables forming the first, second, and third transmission lines are comprised, wherein the plurality of flexible cables are stacked.

An optical disk apparatus according to the present invention is an optical disk apparatus comprising: a motor for rotating an optical disk; and an optical pickup for performing data recording and reproduction for the optical disk by using a plurality of light beams of different wavelengths, the optical pickup including: a first semiconductor laser for emitting a first light beam having a first wavelength; a second semiconductor laser for emitting a second light beam having a second wavelength which is longer than the first wavelength; a third semiconductor laser for emitting a third light beam having a third wavelength which is longer than the second wavelength; at least one objective lens for converging the first, second, and third light beams; an integrated circuit element for driving the first, second, and third semiconductor lasers based on an external signal, the integrated circuit element being shaped so as to have a rectangular principal face surrounded by four sides, with a plurality of input/output pins being arranged along each side, the plurality of input/output pins including a first pin group connected to the first semiconductor laser, a second pin group connected to the second semiconductor laser, and a third pin group connected to the third semiconductor laser; a wiring structure including a first transmission line for connecting the first pin group of the integrated circuit element to the first semiconductor laser, a second transmission line for connecting the second pin group to the second semiconductor laser, and a third transmission line for connecting the third pin group to the third semiconductor laser; and light detection means for generating an electrical signal in response to at least a portion of the first, second, and third light beams reflected from an optical disk, wherein, of the rectangular principal face of the integrated circuit element, the side along which the first pin group is provided is orthogonal to the side along which the second pin group is provided or to the side along which the third pin group is provided, and the first transmission line is shorter than both of the second and third transmission lines.

EFFECTS OF THE INVENTION

In an optical pickup according to the present invention, an integrated circuit element for driving three types of semiconductor lasers is placed in an appropriate position within the optical pickup, such that the length of a transmission line for connecting a semiconductor laser which emits a light beam of the shortest wavelength (short-wavelength laser) to the integrated circuit element is shorter than transmission lines for connecting the other semiconductor lasers to the integrated circuit element. Since the short-wavelength laser is modulated with the highest speed, deteriorations in the signal waveform are likely to occur in the process during which a driving signal is propagated through the transmission line, but according to the present invention, the shortened transmission line effectively suppresses deteriorations in the waveform of the driving signal.

Moreover, according to the present invention, in order to shorten the aforementioned transmission line, a novel construction is adopted for the connections between the integrated circuit element for laser driving and the semiconductor lasers. Specifically, a construction is adopted where, of the four sides of a rectangular principal face of the integrated circuit element, a side along which pins to be connected to the short-wavelength laser are provided is orthogonal to the sides along which pins to be connected to the other semiconductor lasers are provided. As a result, while efficiently connecting the integrated circuit element to the three semiconductor lasers, it also becomes possible to efficiently connect the integrated circuit element to circuits (signal processing circuitry and control circuitry) provided externally to the optical pickup. Thus, wasteful space is reduced and the optical pickup can be downsized.

Figure 1:
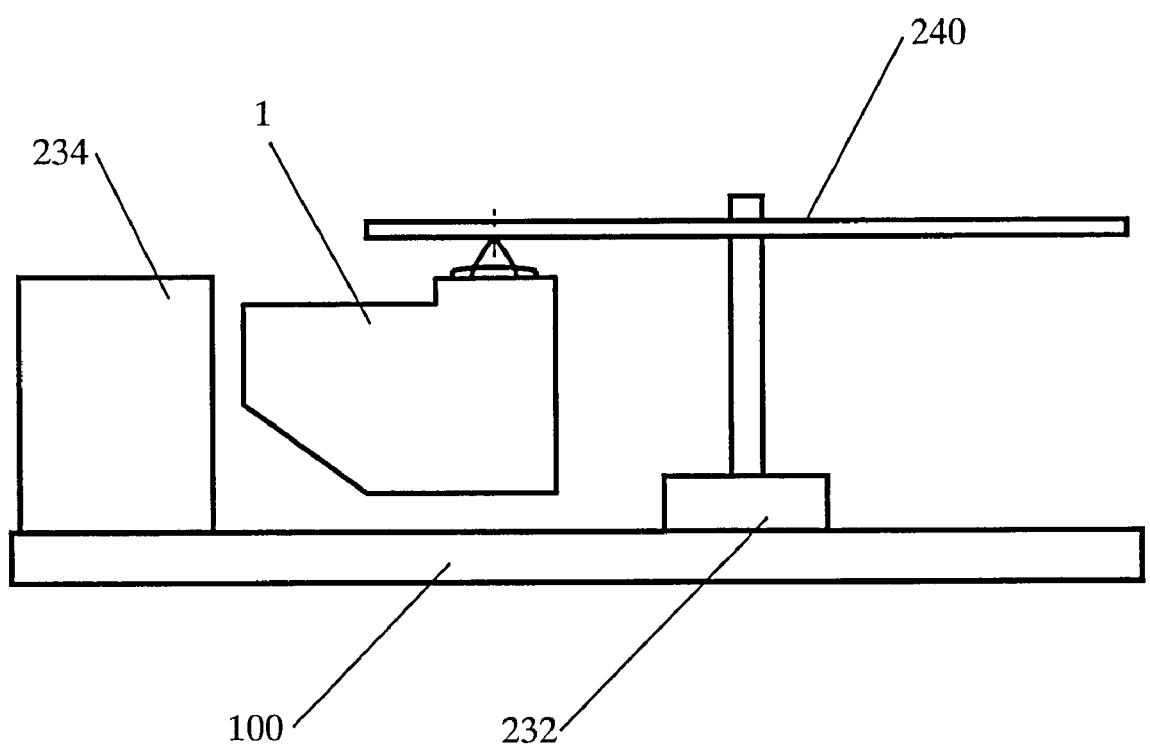
[FIG. 1] A diagram showing the construction of a main portion according to a first embodiment of the optical disk apparatus of the present invention.

| DESCRIPTION OF THE REFERENCE NUMERALS | |
|---|---|
| 1 | optical pickup |
| 2 | actuator |
| 3 | infrared laser |
| 4 | red laser |
| 5 | blue-violet laser |
| 6 | polarization hologram |
| 7 | collimator lens |
| 8 | deflection mirror |
| 9 | objective lens |
| 10 | photosensitive element |
| 11 | collimator lens |
| 12 | polarization beam splitter |
| 13 | deflection mirror |

-continued

DESCRIPTION OF THE REFERENCE NUMERALS

| 14 | objective lens |
|---|---|
| 15 | photosensitive element |
| 20 | first flexible cable |
| 30 | second flexible cable |
| 40 | third flexible cable |
| 50 | laser driving IC |

BEST MODE FOR CARRYING OUT THE INVENTION

Embodiment 1

Hereinafter, a first embodiment of the optical disk apparatus according to the present invention will be described with reference to the figures.

First, FIG. 1 is referred to. FIG. 1 is a diagram showing the construction of a main portion of the optical disk apparatus of the present embodiment. This optical disk apparatus includes: a spindle motor 232 which rotates an optical disk 240; and an optical pickup 1 for performing data recording/reproduction for the optical disk 240. The internal construction of the optical pickup 1 will be specifically described later.

The optical pickup 1 is supported by a stepping motor or DC motor (not shown) so as to be movable. Thus, the optical pickup 1 is able to perform a traverse operation along a radial direction of the optical disk 240. With this traverse operation, the optical pickup 1 is able to access a target track on the optical disk 240. In order to realize a rapid traverse operation, it is preferable that the optical pickup 1 is as light-weight as possible. In FIG. 1, however, the optical pickup 1 is described exaggeratedly larger than its actual size.

The optical disk apparatus shown includes: a power source device 234 which receives externally-supplied power; and a main substrate 100 which supplies power to devices such as the optical pickup 1 and the spindle motor 232 so as to enable transmission/reception of electrical signals between these devices. Although not shown in the figure, various integrated circuit elements to be used for signal processing are mounted on the main substrate 100.

Figure 2:
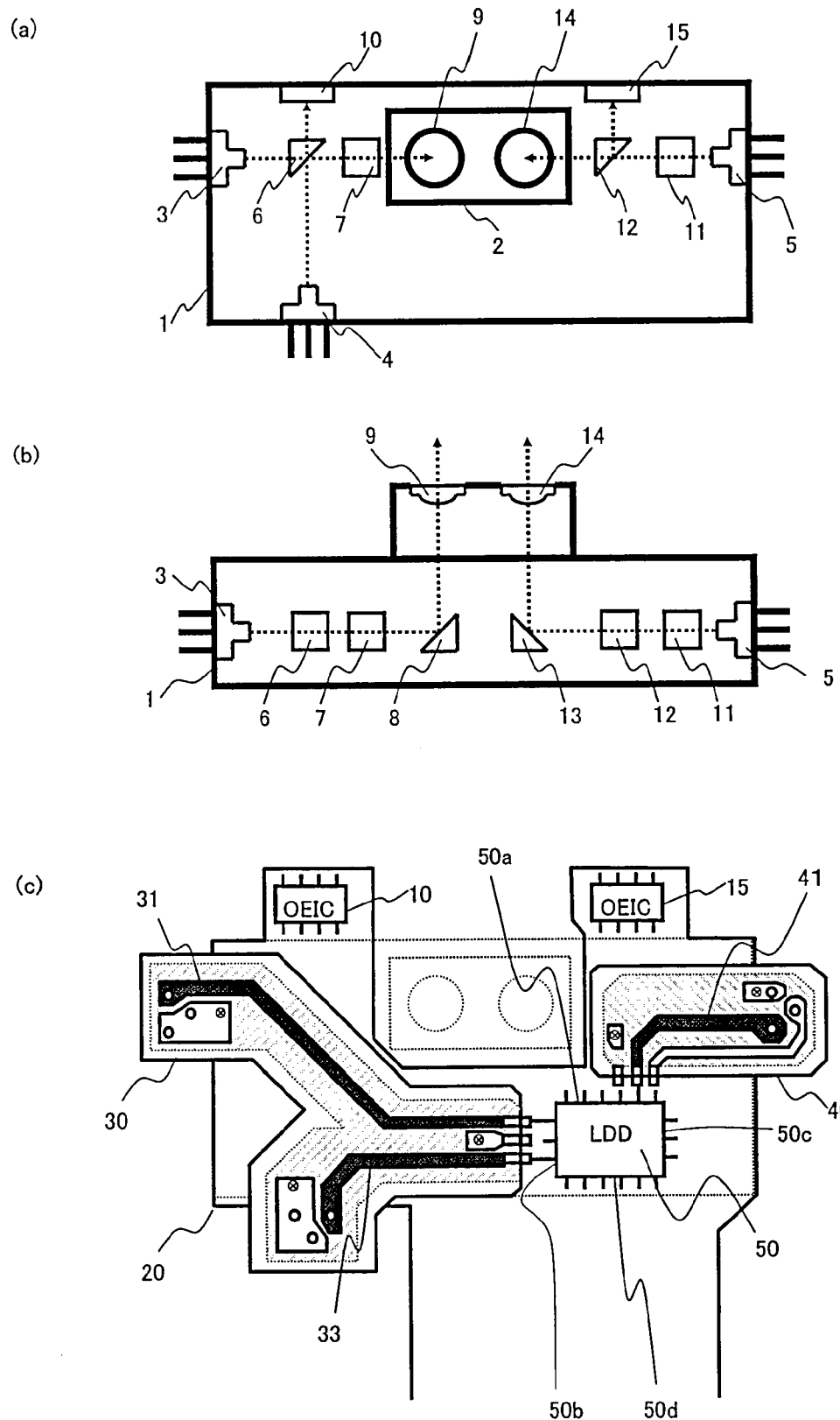
[FIG. 2] (a) is an upper plan view showing the construction of an optical pickup 1 according to the above embodiment; (b) is a side view; and (c) is an upper plan view showing the construction of flexible cables 20, 30, and 40 comprised in the optical pickup 1.

Next, the internal construction of the optical pickup 1 according to the present embodiment will be described with reference to FIGS. 2(a) to (c). FIG. 2(a) is an upper plan view showing the construction of the optical pickup 1, and FIG. 2(b) is a side view. FIG. 2(c) is an upper plan view showing the construction of flexible cables 20, 30, and 40 comprised in the optical pickup 1.

The optical pickup 1 of the present embodiment is a 3 wavelength-type optical pickup including an infrared laser 3, a red laser 4, and a blue-violet laser 5. The lasers 3, 4, and 5 are composed of semiconductor laser elements having respectively different oscillation wavelengths, and are placed in different positions in the optical pickup 1.

In the case where the optical disk 240 mounted in the optical disk apparatus shown in FIG. 1 is a CD, the infrared laser 3 of the optical pickup 1 is driven so that an infrared light beam is emitted from the infrared laser 3. On the other hand, in the case where the optical disk 240 is a DVD, the red laser 4 is driven so that a red light beam is emitted from the red laser 4. In the case where the optical disk 240 is a next-generation optical disk such as a BD, the blue-violet laser 5 is driven so that a blue-violet light beam is emitted from the blue-violet laser 5.

A light beam which has been emitted from the infrared laser 3 or the red laser 4 enters a collimator lens 7, via a polarization hologram 6. The light beam which has been transmitted through the collimator lens 7 is reflected from a deflection mirror 8, and thereafter enters an objective lens 9 which is mounted on an actuator 2. The objective lens 9 converges the light beam onto the optical disk 240 (FIG. 1).

On the other hand, a light beam which has been emitted from the blue-violet laser 5 enters a polarization beam splitter 12 via a collimator lens 11. The light beam which has been transmitted through the polarization beam splitter 12 is reflected from a deflection mirror 13, and thereafter enters an objective lens 14 which is mounted on the actuator 2. The objective lens 14 converges the light beam onto the optical disk 240 (FIG. 1).

In the optical pickup 1 of the present embodiment, the light beam for CDs and the light beam for DVDs are converged by the objective lens 9, whereas the light beam for high-density optical disks such as BDs is converged by the objective lens 14. Note that, depending on the construction of the optical system, these three kinds of light beams can be converged by a single objective lens.

The two objective lenses 9 and 14 are integrally supported by a lens holder, and are driven by the actuator 2. With a high precision, the actuator 2 is able to control the positions of the objective lenses 9 and 14 in a direction perpendicular to and in a direction parallel to an information recording face of the optical disk 240 (FIG. 1).

Although the infrared laser 3 and the red laser 4 are mounted at different positions as separate semiconductor laser elements in the present embodiment, a single semiconductor laser element which is capable of emitting both infrared and red laser light may instead be used.

Next, with reference to FIG. 2(c), the flexible cables 20, 30, and 40 will be described. In the present embodiment, the second flexible cable 30 and the third flexible cable 40 are stacked upon the first flexible cable 20. On the first flexible cable 20, photosensitive elements (OEICs) 10 and 15 and a laser driving IC (LDD) 50 are mounted. Herein, OEIC means "Opto-Electronic Integrated Circuit", whereas LDD means "Laser Diode Driver".

The photosensitive element 10 will receive reflected light which occurs when the optical disk 240 is irradiated with an infrared or red light beam, via the objective lens 9, the deflection mirror 8, the collimator lens 7, and the polarization hologram 6. Similarly, the photosensitive element 15 will receive reflected light which occurs when the optical disk 240 is irradiated with a blue-violet light beam, via the objective lens 14, the deflection mirror 13, and the polarization hologram 12. The photosensitive elements 10 and 15 generate various electrical signals which are in accordance with the intensity (light amount) of the reflected light. As will be described later, the electrical signals which are generated by the photosensitive elements 10 and 15 are sent through the first flexible cable 20, from the optical pickup 1 to signal processing circuitry, etc., in the optical disk apparatus.

The laser driving IC 50 is an integrated circuit element for controlling the operations of the lasers 3, 4, and 5. The laser driving IC 50 generates driving signals so that the lasers 3, 4, and 5 will emit light beams with an appropriate light intensity which is in accordance with the data recording/reproduction mode. Moreover, in order to reduce the influence of the returned light from the optical disk, the laser driving IC 50 adopted in the present embodiment includes a circuit for generating a high-frequency signal to be superposed on the usual driving signal.

The laser driving IC 50 is mounted on the first flexible cable 20, but is connected to the respective lasers 3, 4, and 5 by the second and third flexible cables 30 and 40. The second flexible cable 30 has driving lines for supplying driving currents for the infrared laser 3 and the red laser 4, and connects the laser driving IC 50 to the infrared laser 3 and the red laser 4. On the other hand, the third flexible cable 40 has driving lines for transmission to the blue-violet laser 5, and connects the laser driving IC 50 to the blue-violet laser 5.

As shown in FIG. 2(c), the laser driving IC 50 is shaped so as to have a rectangular principal face that is surrounded by four sides 50a, 50b, 50c, and 50d, with a plurality of input/output pins being arranged along each of the sides 50a, 50b, 50c, and 50d. The number of input/output pins comprised in the laser driving IC 50 according to the present embodiment is illustrated as only 18 in FIG. 2(c) for simplicity, but is 44 in actuality. Such a multitude of pins include a first pin group to be connected to the blue-violet laser 5, a second pin group to be connected to the red laser 4, and a third pin group to be connected to the infrared laser 3, as well as a pin to which a high-frequency superposition control signal is input, and the like.

A wiring structure of the optical pickup 1 includes a blue-violet laser driving signal line 41 as a first transmission line for connecting the first pin group of the laser driving IC 50 to the blue-violet laser 5. Also included are: a red laser driving signal line 33 as a second transmission line for connecting the second pin group to the red laser 4; and an infrared laser driving signal line 31 as a third transmission line for connecting the third pin group to the infrared laser 3. In the present embodiment, the laser driving IC 50 is placed so as to be closer to the blue-violet laser 5 rather than in the center of the optical pickup 1, thus setting a relatively short length for the blue-violet laser driving signal line 41. Specifically, the length of the blue-violet laser driving signal line 41 is set at 15 to 25 mm, for example, so as to be shorter than the lengths of the red laser driving signal line 33 and the infrared laser driving signal line 31 (e.g. 35 to 50 mm). In the case where a high-frequency signal is superposed, the blue-violet laser 5 is to be modulated with the highest speed (e.g. 370 MHz), and therefore deteriorations of the signal waveform are likely to occur during the process in which the driving signal for the blue-violet laser 5 is propagated through the blue-violet laser driving signal line 41. However, the construction of the present embodiment effectively suppresses deteriorations in the waveform of the driving signal by reducing the length of the blue-violet laser driving signal line 41.

Moreover, as shown in FIG. 2(c), the present embodiment adopts a construction in which, of the rectangular principal face of the laser driving IC 50, a side 50a along which the first pin group is provided is orthogonal to a side 50b along which the second and third pin groups are provided. The mere objective of reducing the length of the blue-violet laser driving signal line 41 could also be attained by adopting a construction in which, of the rectangular principal face of the laser driving IC 50, the side 50a along which the first pin group is provided opposes the side 50b along which the second and third pin groups are provided. However, in the present embodiment, the first, second, and third pin groups are concentrated along the two orthogonal sides 50a and 50b, thus making all of the pins provided along the sides 50c and 50d available for connection with external circuitry.

Further according to the present embodiment, not only the length of the blue-violet laser driving signal line 41 is reduced as compared to the other laser driving signal lines 31 and 33, but also the characteristic impedance of the blue-violet laser driving signal line 41 is designed so as to be substantially equal to the equivalent serial resistance value of the blue-violet laser 5.

Figure 3:
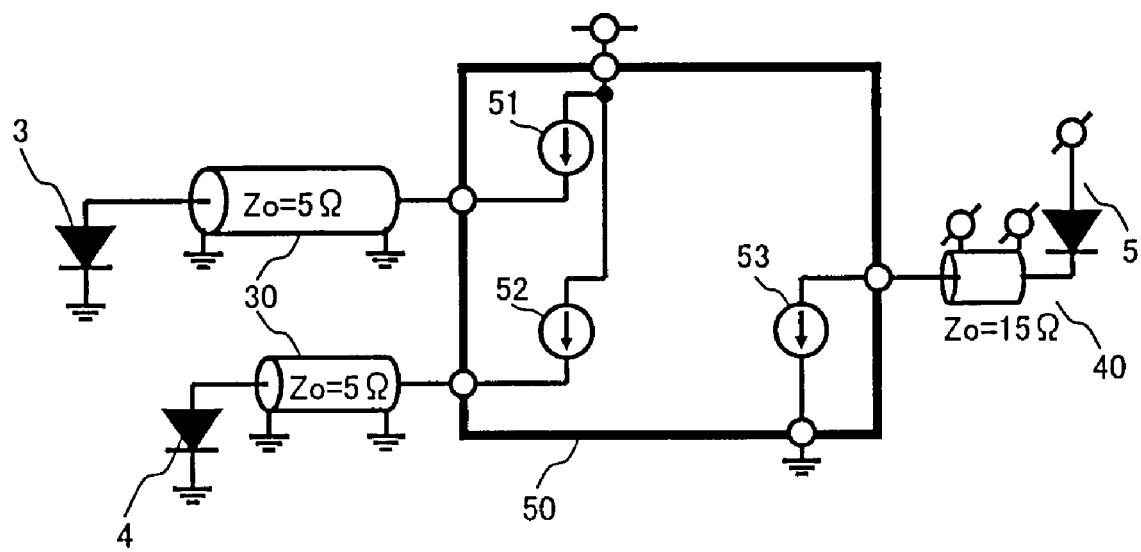
[FIG. 3] An equivalent circuit diagram of a laser driving section in the optical pickup 1 of the above embodiment.

FIG. 3 shows an equivalent circuit of a portion in the construction of FIG. 2(c) that concerns laser driving. The laser driving IC 50 includes flow-out current sources 51 and 52 and a flow-in current source 53, which are respectively connected to the infrared laser 3, the red laser 4, and the blue-violet laser 5. A driving current for the infrared laser 3 is generated by the flow-out current source 51, propagates through the transmission line of the second flexible cable 30, and is supplied to the infrared laser 3. Similarly, a driving current for the red laser 4 is generated by the flow-out current source 52, propagates through the transmission line of the second flexible cable 30, and is supplied to the red laser 4. A driving current for the blue laser 5 is generated by the flow-in current source 53, propagates through the transmission line of the third flexible cable 40, and is supplied to the blue-violet laser 5.

The reason why the flow-in current source 53 is provided for the blue-violet laser 5 and is connected to a different electrical power supply from the electrical power supply for the flow-out current sources 51 and 52 is to allow the blue-violet laser 5 to operate at a voltage (e.g. 5V) which is higher than that of the other lasers 3 and 4. In the example shown in FIG. 3, the electrical power supply is connected to the anode of the blue-violet laser 5, while the cathode is connected to the laser driving IC 50. On the other hand, as for the infrared laser 3 and the red laser 4, the anode is connected to the laser driving IC 50, while the cathode is grounded.

Note that high-frequency superposition is performed at the time of data reproduction. During data recording, the driving current is modulated in accordance with the data to be recorded.

In the present embodiment, the length of the transmission line for supplying a driving current for the blue-violet laser 5, which has the shortest oscillation wavelength, is prescribed so as to be shorter than the length of the transmission line for supplying a driving current to the infrared laser 3 or the red laser 4. The blue-violet laser 5 to be used for the recording/reproduction for high-density optical disks needs to be modulated at a higher frequency than those for the other lasers 3 and 4, which makes its recording/reproduction characteristics particularly susceptible to adverse influences of the deteriorations in a modulation waveform occurring on the transmission line. However, in accordance with the present embodiment, the impedance of the transmission line is reduced by the shortened transmission line, and therefore deteriorations in the current waveforms for driving the blue-violet laser 5 can be appropriately suppressed even during rapid modulation, whereby excellent recording/reproduction characteristics are realized. Note that, in the case where separate laser driving ICs are used for the individual lasers 3, 4, and 5, each transmission line can be shortened by placing the laser driving IC in the neighborhood of each laser. However, in the case where a single laser driving IC is shared among a plurality of lasers as in the present embodiment, positioning of the laser driving IC becomes important.

Note that, in the present embodiment, the characteristic impedance of each transmission line for supplying a driving current for the laser 3, 4, or 5 is prescribed so as to be generally equal to the equivalent serial resistance value of the laser 3, 4, or 5. Specifically, since the infrared laser 3 and the red laser 4 used in the present embodiment have equivalent serial resistance values Zo of about 5Ω, the second flexible cable 30 is designed so that the characteristic impedance of the transmission line of the second flexible cable 30 is 5Ω.

Moreover, since the equivalent serial resistance value of the blue-violet laser 5 is about 15Ω, the third flexible cable 40 is designed so that the characteristic impedance of the transmission line of the third flexible cable 40 is 15Ω.

Next, with reference to FIG. 4(a) to FIG. 4(c), the wiring structure of the optical pickup 1 will be described more specifically.

Figure 4:
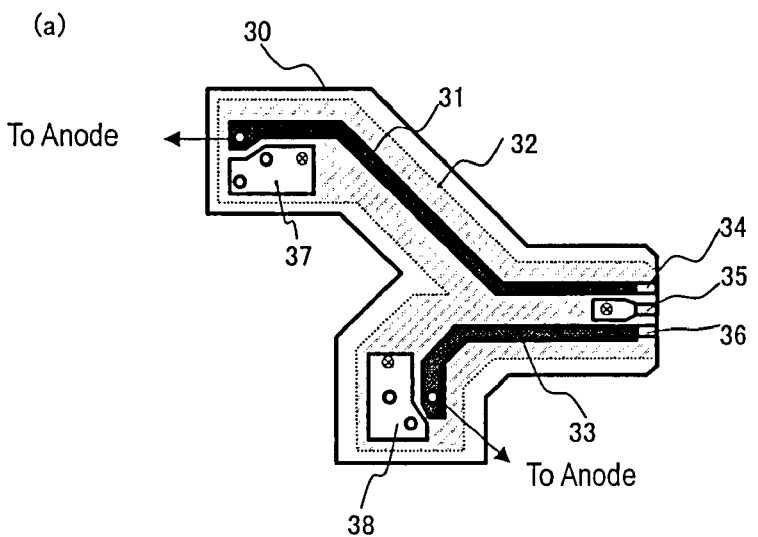
[FIG. 4] (a) is a diagram showing the construction of a second flexible cable 30 according to the above embodiment; (b) is a diagram showing the construction of a third flexible cable 40; and (c) is a diagram showing the construction of connection lands on the first flexible cable 20.
Figure 4:
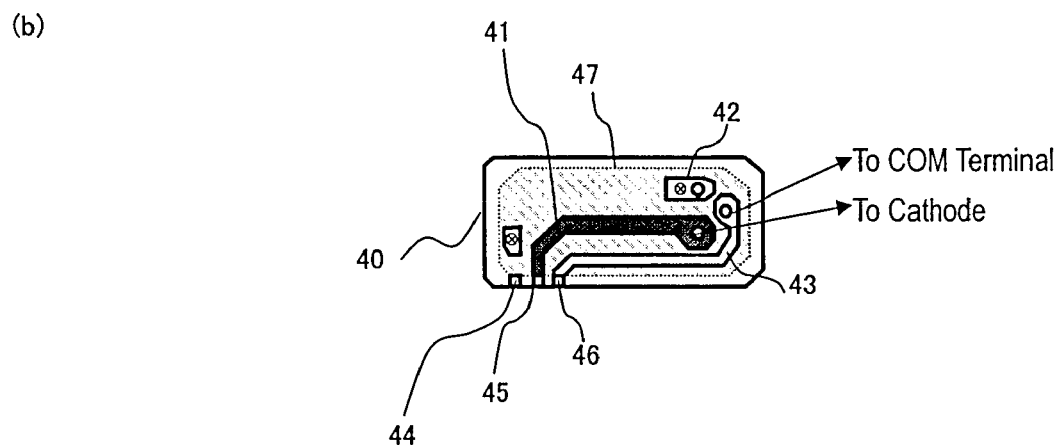
Figure 4:
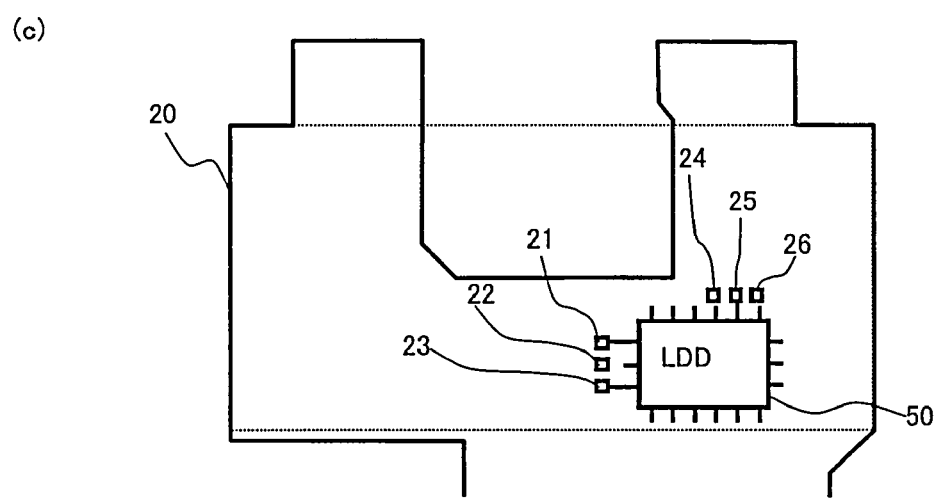
Figure 5:
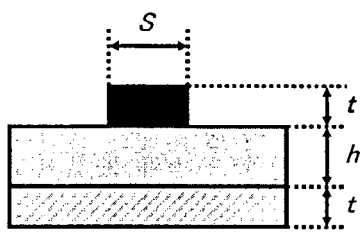
[FIG. 5] (a) is a cross-sectional view showing a microstrip line structure of the second and third flexible cables; and (b) is a cross-sectional view showing a microstrip line structure of the first flexible cable.
Figure 5:
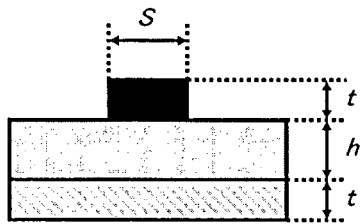

First, FIG. 4(a) is referred to. FIG. 4(a) shows the construction of the second flexible cable 30 in detail. The second flexible cable 30 used in the present embodiment has a two-layer wiring structure. Specifically, the infrared laser driving signal line 31 and the red laser driving signal line 33 are formed in a first layer, whereas a ground plane (GND line 32) is formed in a second layer. The first layer and the second layer compose a microstrip line structure as shown in FIG. 5(a). In the example shown in FIG. 5(a), the first layer (signal line) and the second layer (GND line) are each formed of a copper foil having a thickness t, and the first layer (signal line) has a line width S. Moreover, a base film (intermediate layer) of the second flexible cable 30 is formed of an insulating layer (dielectric layer, thickness: h) having a dielectric constant ∈.

On the side of the second flexible cable 30 on which the first layer is formed, cathode/COM connection lands 37 and 38, an infrared laser driving signal connection land 34, a GND connection land 35, and a red laser driving signal connection land 36 are provided. The cathode/COM connection lands 37 and 38 are conductive layers for electrically connecting the cathodes of the infrared laser 3 and the red laser 4, respectively, to the GND line 32 in the second layer. The infrared laser driving signal connection land 34, the GND connection land 35, and the red laser driving signal connection land 36 are respectively connected to an infrared laser driving signal connection land 21, a GND connection land 22, and a red laser driving signal connection land 23 which are on the first flexible cable 20 shown in FIG. 4(c). The infrared laser driving signal connection land 21, the GND connection land 22, and the red laser driving signal connection land 23 on the first flexible cable 20 are connected to pins that are provided along the side 50b of the laser driving IC 50 (FIG. 2(c)) being mounted on the first flexible cable 20. Note that one end of the infrared laser driving signal line 31 is connected to the anode of the infrared laser 3, whereas one end of the red laser driving signal line 33 is connected to the anode of the red laser 4.

The characteristic impedance of a transmission line having the microstrip line structure shown in FIG. 5(a) is determined by the line width S and thickness t of the signal line, the thickness h and dielectric constant ∈ of the dielectric layer, and the thickness t of the ground plane. According to the present embodiment, these parameters are as follows.

When a flexible cable as follows is used:
t=35 [μm]
h=25.4 [μm]
∈=3.5, the line width S of the signal line is:
S=1.0 [mm].

Based on these parameters, the characteristic impedance Zo of the transmission line is calculated to be Z=4.7[Ω]. This value is generally equal to the equivalent serial resistance values (5Ω) of the infrared laser 3 and the red laser 4.

Next, FIG. 4(b) is referred to. FIG. 4(b) shows the construction of the third flexible cable 40. The third flexible cable 40 also has a two-layer wiring structure, where the violet laser driving line 41 is formed in a first layer, and a power plane (anode power line 47) which is connected to the anode of the blue-violet laser 5 is formed in a second layer. The first layer and the second layer compose a microstrip line structure as shown in FIG. 5(b). In the example shown in FIG. 5(b), the first layer (signal line) and the second layer (power line) are each formed of a copper foil having a thickness t, and the first layer (signal line) has a line width S. Moreover, a base film (intermediate layer) of the flexible cable is formed of an insulating layer (dielectric layer, thickness: h) having a dielectric constant ∈.

On the side of the third flexible cable 40 on which the first layer is formed, an anode connection land 42, a GND line 43, an anode power connection land 44, a blue-violet laser driving signal connection land 45, and a GND connection land 46 are provided. The anode connection land 42 is a conductive layer for electrically connecting the anode of the blue-violet laser 5 to the anode power line 47 in the second layer. Note that one end of the blue-violet laser driving signal line 41 is connected to the cathode of the blue-violet laser 5, whereas one end of the GND connection line 43 may be connected to a COM terminal (which is an abbreviation of "COMMOM terminal") of the blue-violet laser 5.

Since the blue-violet laser 5 according to the present embodiment is connected to the flow-in current source 53, the blue-violet laser 5 is not packaged as a "cathode-common type" where the cathode and the package GND are short-circuited, but packaged as a "cathode-floating type" where the cathode is in a floating state. By adopting the "cathode-floating type", as shown in FIG. 3, it becomes possible to connect the cathode of the blue-violet laser 5 to the flow-in current source 53 of the laser driving IC 50, but the "cathode-floating type" package is inferior to the "cathode-common type" package in terms of heat-releasing ability. Therefore, in order to enhance the heat-releasing ability, it is preferable to connect a COMMON terminal which is provided in the "cathode-floating type" package to the GND line 43 of the third flexible cable 40. Note that, instead of connecting the COMMON terminal to the GND line 43, the GND line 43 and the anode power line may be connected via a bypass capacitor in order to improve the high-frequency characteristics.

By appropriately setting the line width of the violet laser driving line 41, its characteristic impedance can be designed so as to be generally equal to the equivalent serial resistance value (15Ω) of the blue-violet laser 5.

In the present embodiment, as shown in FIG. 4(c), the laser driving IC 50 is mounted on the first flexible cable 20, and therefore transmission of an infrared laser driving signal and a red laser driving signal which are output from the laser driving IC 50 as well as the ground can be achieved by connecting the connection lands 34, 35, and 36 of the second flexible cable to the connection lands 21, 22, and 23 on the first flexible cable 20.

As will be described later, a multitude of signal lines are formed in the first layer and the second layer of the first flexible cable 20 used in the present embodiment. This makes it impossible to secure on the first flexible cable 20 a space which is necessary for constituting a GND plane of a microstrip line for allowing driving signals from the laser driving IC 50 to be transmitted to the infrared laser 3 and the red laser 4.

For similar reasons, it is impossible to secure on the first flexible cable 20 a space which is necessary for constituting a power plane of a microstrip line for allowing a driving signal from the laser driving IC 50 to be transmitted to the blue-violet laser 5.

If a flexible cable having a three-layer structure is adopted instead of the first flexible cable 20, a space necessary for constituting the aforementioned ground plane and power plane will be secured, but the production cost will be greatly increased.

In the present embodiment, when producing the first flexible cable 20, the second and third flexible cables 30 and 40 are produced by utilizing remainders of the flexible cable. Then, during a production step of the optical pickup, the connection lands 21, 22, and 23 of the first flexible cable 20 are respectively connected to the connection lands 34, 35, and 36 of the second flexible cable 30. Similarly, the connection lands 24, 25, and 26 of the first flexible cable 20 are connected to the connection lands 44, 45, and 46 of the third flexible cable 40. By doing so, an increase in cost which would be necessitated in producing a three-layer structure flexible cable can be avoided.

Figure 6:
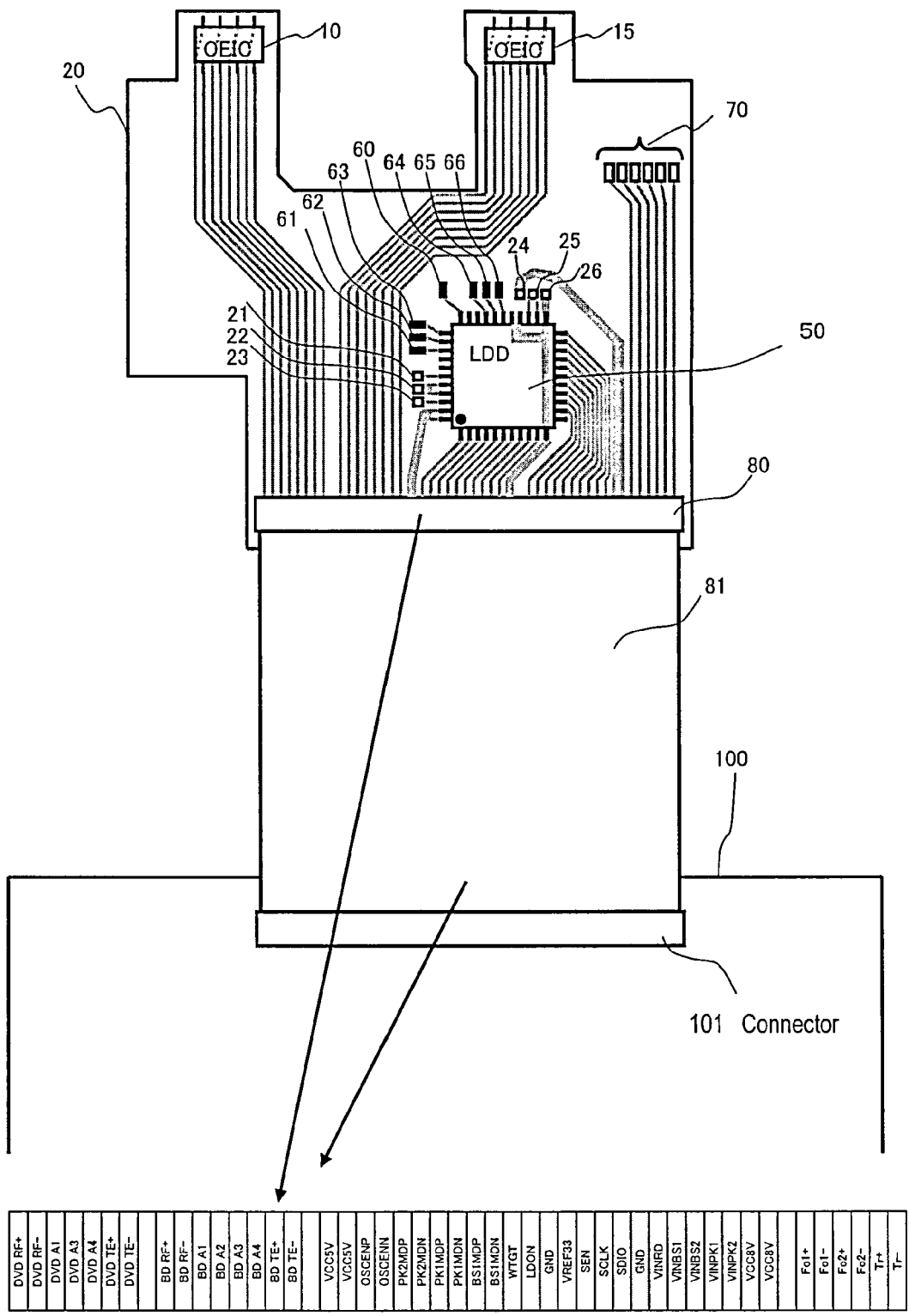
[FIG. 6] A plan view showing the construction of the first flexible cable 20 according to the above embodiment.

Next, with reference to FIG. 6, the interconnection between the first flexible cable 20 and the laser driving IC 50 will be described more specifically. FIG. 6 is an upper plan view showing the construction of the first layer and the connection lands on the first flexible cable 20.

As shown in FIG. 6, the first flexible cable 20 is connected to a flexible cable 81 via a connector 80. The flexible cable 81 is connected to the main substrate 100 via a connector 101 on the side of the main substrate 100.

On the first flexible cable 20, wiring lines to be connected to the photosensitive elements (OEICs) 10 and 15 and a wiring line for sending a driving current to the actuator 2 (FIG. 2) are formed. An actuator connection land 70 is formed at one end of the wiring line for the actuator 2, such that electrical connection between the actuator 2 and the second first flexible cable 20 is established via the actuator connection land 70.

Connection lands 60 to 66 are provided on the first flexible cable 20, with resistors (not shown) being connected thereto.

Figure 7:
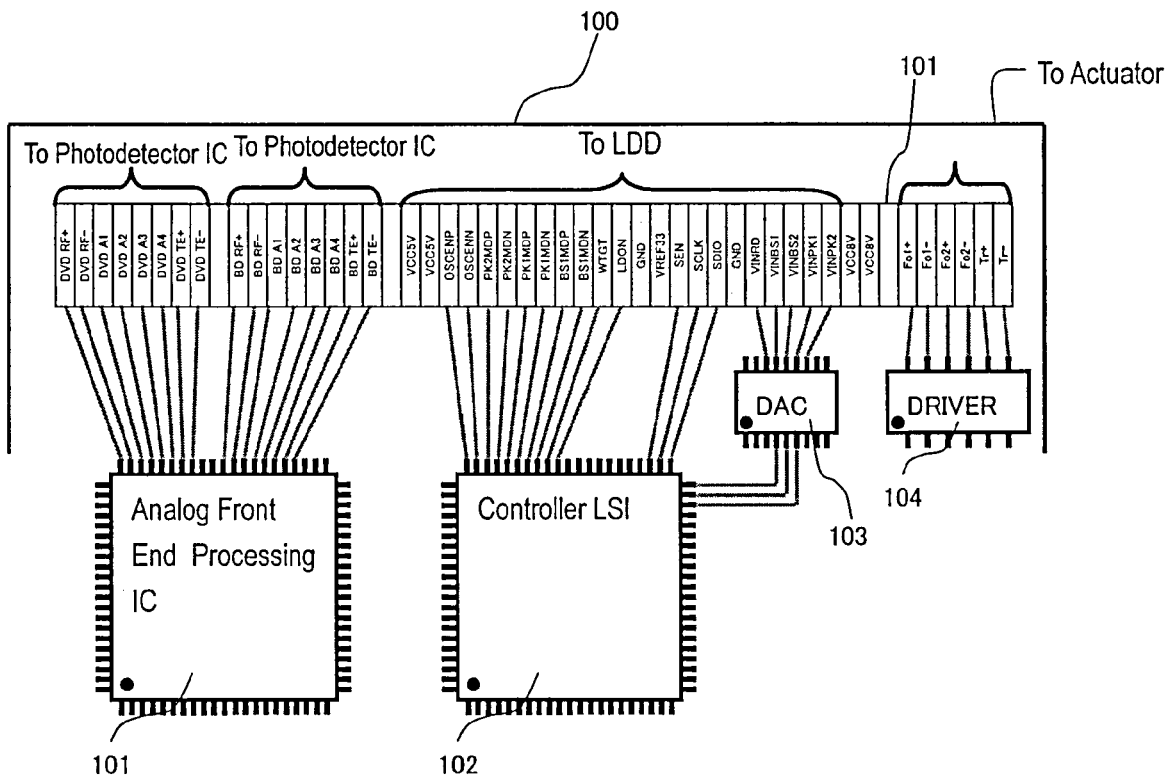
[FIG. 7] A plan view showing a partial construction of a main substrate 100 which is connected to the first flexible cable 20 according to the above embodiment.

The electrical signals which are output from the photosensitive elements (OEICs) 10 and 15 are sent to the main substrate 100 via the wiring lines of the first flexible cable 20 and the flexible cable 81, and is input to an analog front end processing IC 101 which is mounted on the main substrate 100 as shown in FIG. 7. Based on the electrical signals from the photosensitive elements 10 and 15, the analog front end processing IC 101 performs known calculations which are necessary for tracking control and focus control.

Also mounted on the main substrate 100 shown in FIG. 7 are a controller LSI 102, a digital-analog converter (DAC) 103, an actuator driving circuit (DRIVER) 104, and the like. The controller LSI 102 and the DAC 103 are connected to the laser driving IC (LDD) 50 to control the operation of the laser driving IC (LDD) 50, whereas the DRIVER 104 is connected to the actuator to control the operation of the actuator.

FIG. 6 is again referred to. The aforementioned integrated circuit elements on the main substrate 100 are connected to the wiring structure of the first flexible cable 20 via the connector 101, the flexible cable 81, and the connector 80. The flexible cable 81 has a length with a sufficient margin even when the optical pickup 1 is greatly moved by a motor (not shown) in a radial direction of the optical disk. When the optical pickup 1 moves close to the connector 101, the flexible cable 81 will be folded, in a pile, inside the optical disk apparatus.

As will be clear from FIG. 6 and FIG. 7, the laser driving IC (LDD) 50 includes a multitude of input/output pins, and needs to exchange many types of signals with various circuits lying external to the optical pickup. Therefore, in order to shorten a transmission line for propagating a driving signal for a laser, it is very important as to which pins are used for connection to the semiconductor laser. In accordance with the optical pickup of the present embodiment, by adopting a novel manner of connection in such a situation, the high-frequency transmission characteristics can be improved and downsizing can be realized, while easily realizing external connection.

Figure 8:
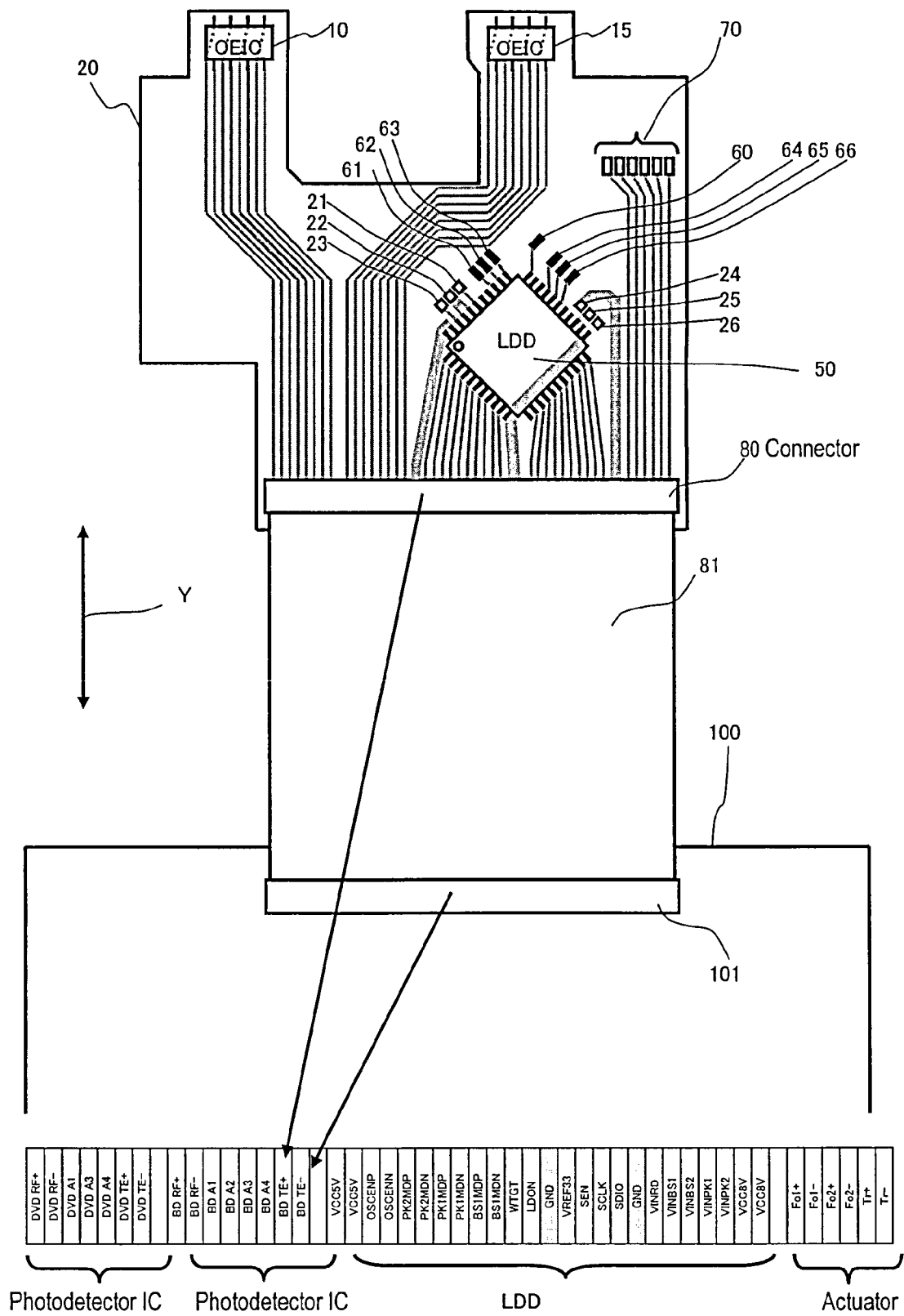
[FIG. 8] A plan view showing another construction for the first flexible cable 20 according to the above embodiment.

Next, with reference to FIG. 8, an improvement over the present embodiment will be described. The construction shown in FIG. 8 differs from the construction shown in FIG. 6 with respect to the orientation of the laser driving IC 50. In the example shown in FIG. 8, one of the diagonals of the rectangular principal face of the laser driving IC 50 is oriented so as to be substantially parallel to the traveling direction (traverse direction Y) of the optical pickup.

By adopting such a construction, a vertex which is located between the two sides (among the four sides of the rectangular plane of the laser driving IC 50) that are not used for connection with the semiconductor lasers 3, 4, and 5 is placed close to the connector 80. As a result, connections with external circuitry can be easily established via the pins which are provided along the two sides (among the four sides of the laser driving IC 50) that are not used for connection with the semiconductor lasers 3, 4, and 5. Such an effect can be obtained by rotating the orientation of the laser driving IC 50 by about 30 to 40° with respect to the orientation of FIG. 6.

The relationship between the 44 pins of the laser driving IC 50 used in the present embodiment and the signals corresponding to the respective pins is shown in Table 1 below. Also, the relationship between the connector terminals and the signal names assigned to respective terminals is shown in FIG. 6 to FIG. 8.

TABLE 1

| | | |
|---|---|---|
| 1 | OSCENP | high-frequency superposition control signal |
| 2 | OSCENN | high-frequency superposition control signal |
| 3 | PK2MDP | peak2 modulation signal |
| 4 | PK2MDN | peak2 modulation signal |
| 5 | PK1MDP | peak1 modulation signal |
| 6 | PK1MDN | peak1 modulation signal |
| 7 | BS1MDP | bias1 modulation signal |
| 8 | BS1MDN | bias1 modulation signal |
| 9 | WTGT | recording gate |
| 10 | ENABLE | chip enable |
| 11 | GND | |
| 12 | VREF33 | regulator output |
| 13 | SEN | serial enable |
| 14 | SCLK | serial clock |
| 15 | SDIO | serial data |
| 16 | GND | |
| 17 | VINRD | current setting terminal for reproduction output |
| 18 | VINBS1 | current setting terminal for bias1 output |
| 19 | VINBS2 | current setting terminal for bias2 output |
| 20 | VINPK1 | current setting terminal for peak1 output |
| 21 | VINPK2 | current setting terminal for peak2 output |
| 22 | VCC | |
| 23 | GND | |
| 24 | LDOUT3 | LDOUT3 output terminal (BLUE) |
| 25 | LDOUT3 | LDOUT3 output terminal (BLUE) |
| 26 | GND | |
| 27 | GND | |
| 28 | NC | |
| 29 | FADJ3 | high-frequency superposition amplitude setting terminal (LD3) |
| 30 | FADJ2 | high-frequency superposition amplitude setting terminal (LD2) |
| 31 | FADJ1 | high-frequency superposition amplitude setting terminal (LD1) |
| 32 | VCC | |
| 33 | RREF | connection terminal for resistor for reference current generation |
| 34 | FADJ3 | high-frequency superposition frequency setting terminal (LD3) |
| 35 | FADJ2 | high-frequency superposition frequency setting terminal (LD2) |
| 36 | FADJ1 | high-frequency superposition frequency setting terminal (LD1) |
| 37 | VCC | |

TABLE 1-continued

| 38 | VCC |   |
|----|-----|---|
| 39 | LDOUT2 | LDOUT2 output terminal |
| 40 | GND |   |
| 41 | GND |   |
| 42 | LDOUT1 | LDOUT1 output terminal |
| 43 | VCC |   |
| 44 | VCC |   |

According to the present embodiment, the high-frequency signal propagation characteristics associated with a transmission line used for driving a blue-violet laser are improved, and furthermore, impedance matching is established with respect to the transmission line used for driving each laser, whereby power transmission losses are reduced and good laser driving characteristics are obtained. As a result, the high-frequency superposition characteristics during data reproduction are improved, and the noise due to returned light of laser light is reduced, thus making it possible to realize good reproduction characteristics also for high-density optical disks of the next generation. Furthermore, since overshooting, etc., of the pulse waveform during data recording is improved, good data recording characteristics can be obtained.

Figure 9:
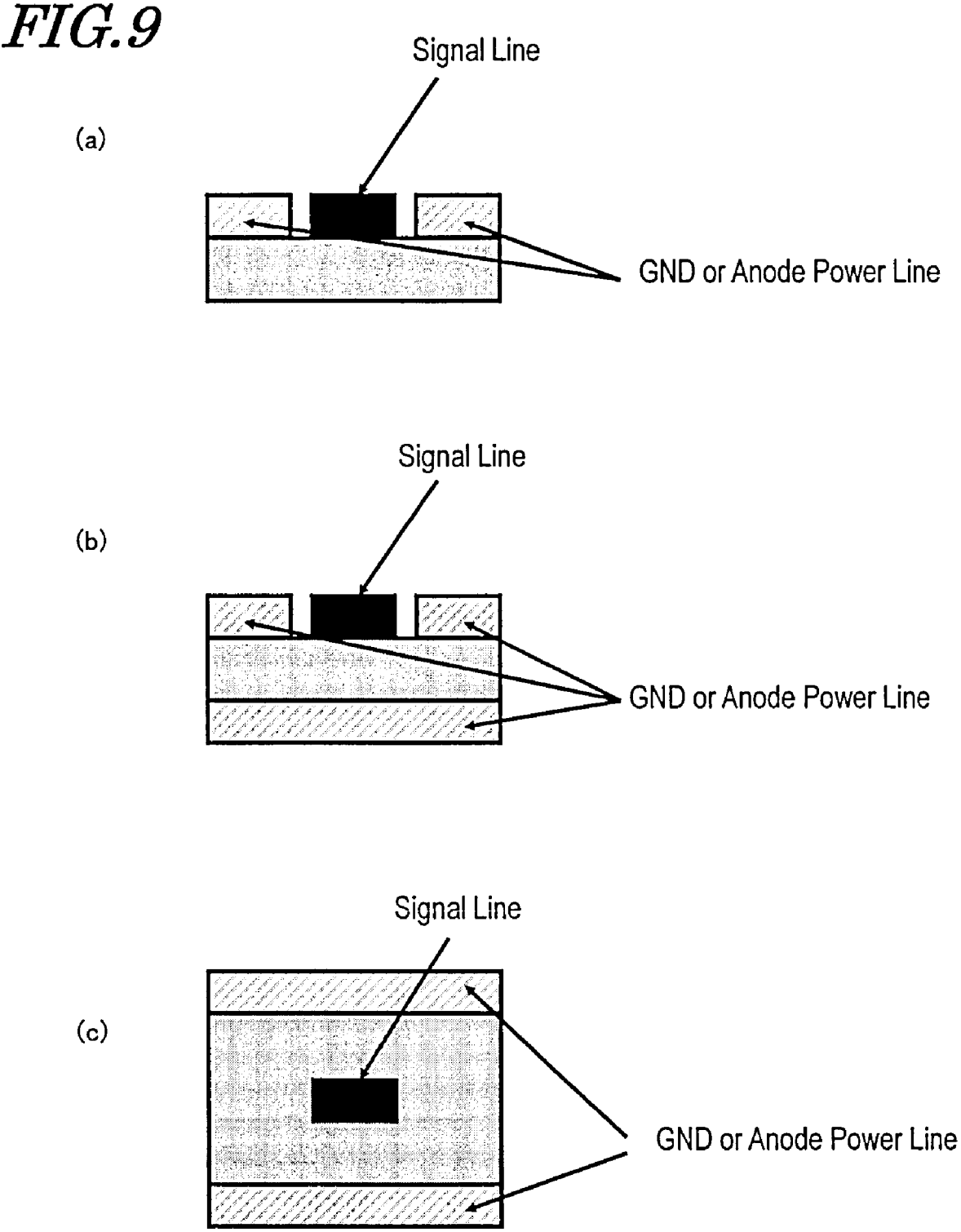
[FIG. 9] (a) to (c) are diagrams showing other exemplary cross-sectional structures of flexible cables which can be used in the above embodiment.

Although the transmission lines (driving lines) for laser driving signals are each composed of a microstrip line structure in the above embodiment, the present invention is not limited thereto. The transmission lines may be each composed of a coplanar waveguide as shown in FIG. 9(a), or the transmission lines may be each composed of a grounded coplanar waveguide as shown in FIG. 9(b). Moreover, the transmission lines may be each composed of a three-layered microstrip line structure as shown in FIG. 9(c).

Embodiment 2

Figure 10:
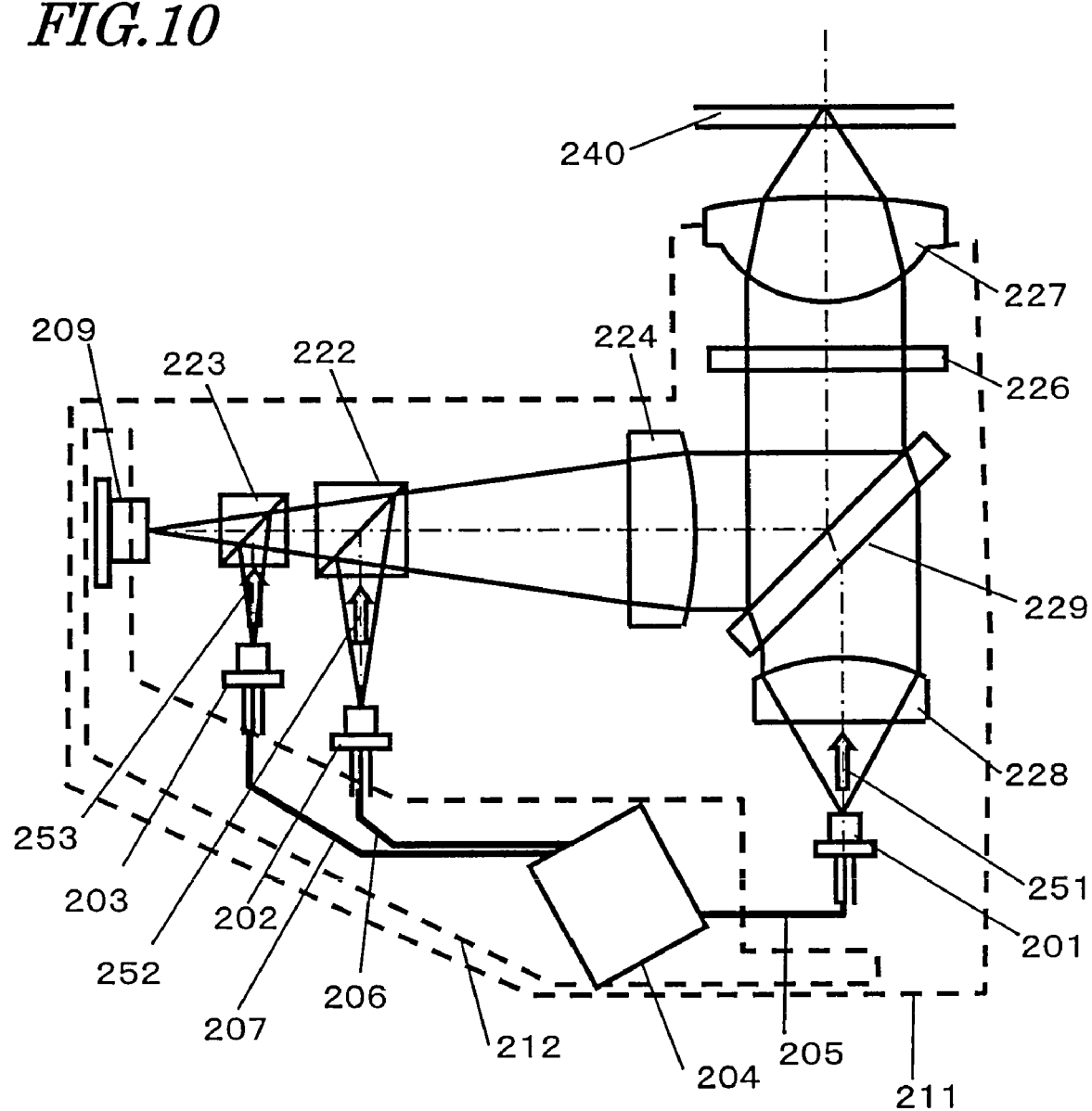
[FIG. 10] A diagram showing the construction of a main portion according to a second embodiment of the optical disk apparatus of the present invention.

Next, a second embodiment of the optical disk apparatus according to the present invention will be described with reference to FIG. 10. FIG. 10 is a construction diagram showing an optical pickup according to the present embodiment.

The optical pickup of the present embodiment includes three semiconductor lasers 201, 202, and 203 having different oscillation wavelengths, but differs from the optical pickup of Embodiment 1 in that there is only a single objective lens 227 that converges a light beam onto an optical disk 240.

The optical pickup of the present embodiment includes a flexible printed wiring board 212 on which a laser driving IC 204 and a photodetector 209 as well as other electrical parts (not shown) are mounted. On the flexible printed wiring board 212, wiring lines 205, 206, and 207 are formed from a copper foil pattern. The wiring lines 205, 206, and 207 constitute transmission lines for connecting the semiconductor lasers 201, 202, and 203, respectively, to the laser driving IC 204.

The laser driving IC 204 according to the present embodiment is an integrated circuit element which is similar in construction and function to the laser driving IC 50 of Embodiment 1. As can be seen from FIG. 10, the wiring line 205 is connected to one of two adjoining sides of the laser driving IC 204, and the wiring lines 206 and 207 are connected to the other. The node to the wiring line 205 on the laser driving IC 204 is positioned substantially diagonally with respect to the nodes to the wiring lines 206 and 207. Moreover, the laser driving IC 204 is rotated so that the total stretch of the wiring lines 205, 206, and 207 becomes shortest, as in the example of FIG. 8.

The semiconductor lasers 201, 202, and 203 used in the present embodiment have oscillation wavelengths of $\lambda a$, $\lambda b$, and $\lambda c$, respectively, where the relationships 390 nm<$\lambda a$<420 nm; 640 nm<$\lambda b$<670 nm; and 780 nm<$\lambda c$<820 nm are satisfied. On the other hand, the wiring lines 205, 206, and 207 have lengths La, Lb, and Lc, respectively, where the relationship La<Lb<Lc is satisfied.

Thus, in the present embodiment, shorter wiring lengths are allocated for those semiconductor laser having shorter wavelengths, which are modulated at relatively high speeds as compared to those semiconductor lasers having longer oscillation wavelengths.

In the case where the optical disk 240 is an optical disk complying with a standard which supports light of the wavelength $\lambda a$ (e.g., a BD), a light beam (forward-path light) 251 that is emitted from a semiconductor laser 201 having the oscillation wavelength $\lambda a$, which emits light when a current is supplied from the laser driving IC 204 via the wiring line 205, passes through a converging lens 228 and enters a beam splitter 229. The beam splitter 229 has characteristics such that, while allowing light of the wavelength $\lambda a$ to be transmitted therethrough, it reflects light beams of the wavelengths $\lambda b$ and $\lambda c$ regardless of their polarization directions.

The light beam of the wavelength $\lambda a$ having been converged by the objective lens 227 is reflected from the optical disk 240, and thereafter has its polarization state converted by a wavelength plate 226, thus becoming return-path light. The polarization direction of the return-path light is rotated by 90° from the polarization direction of the forward-path light 251. The return-path light is not transmitted through the beam splitter 229 but reflected therefrom, and thereafter transmitted through the converging lens 224, thus entering a beam splitter 222. The beam splitter 229 has characteristics such that it causes reflection and transmission of light of the wavelength $\lambda a$ depending on its polarization direction, while reflecting light of the wavelengths $\lambda b$ and $\lambda c$ regardless of its polarization state.

The light having been transmitted through the beam splitter 222 is transmitted through a beam splitter 223 and enters the photodetector 209. The beam splitter 223 has characteristics such that it switches between reflection and transmission for light of the wavelength $\lambda b$ depending on its polarization direction, while allowing light of wavelengths $\lambda a$ and $\lambda c$ to be transmitted therethrough. The return-path light having entered the photodetector 209 is subjected to an optical-electrical conversion and detected as an electrical signal. The electrical signal which is detected by the detector 209 is used as an RF signal of the pit sequences on the optical disk 40, or as a servo signal for tracing the pit sequences.

When recording data onto the optical disk 240, a driving current which has been rapidly modulated is output from the laser driving IC 204, and supplied to the semiconductor laser 201. In the process of propagating through the wiring line 205, the modulation waveform of the driving current is deformed more so than not, and therefore is deteriorated as compared to an ideal waveform which will realize correct recording of the emission waveform of the semiconductor laser 201. When this influence is large, recording with a good precision becomes difficult, and the reliability of data recording is lowered. However, in the present embodiment, the length of the wiring line 205 is prescribed to be the shortest, so that such lowering of reliability is avoided.

Note that, in the case where the optical disk 240 is an optical disk complying with a standard which supports light of the wavelength $\lambda b$ (e.g., a DVD), a driving current is supplied to the semiconductor laser 202 from the laser driving IC 204 via the wiring line 206, thus causing light emission. A light beam (forward-path light) 252 which is emitted from the semiconductor laser 202 is reflected from the beam splitter 222, and thereafter passes through the converging lens 224 to enter the beam splitter 229. The light beam having been reflected from the beam splitter 229 passes through the wavelength plate 226 to become circularly polarized light, enters the objective lens 227, and is converged onto the optical disk 240.

The return-path light having been reflected from the optical disk 240 passes through the objective lens 227, and is transmitted through the wavelength plate 226, thus being converted into linearly polarized light which is polarized in a direction orthogonal to the polarization direction of the forward-path light 252. Thereafter, it is transmitted through the converging lens 224 and the beam splitters 222 and 223. The light which has been transmitted through the beam splitters 222 and 223 enters the photodetector 209. The return-path light having entered the photodetector 209 is subjected to an optical-electrical conversion, whereby an electrical signal is generated.

In the case where the optical disk 240 is an optical disk complying with a standard which supports light of the wavelength $\lambda c$ (e.g., a CD), a driving current is supplied to the semiconductor laser 203 from the laser driving IC 204 via the wiring line 207, thus causing light emission. A light beam (forward-path light) 253 which is emitted from the semiconductor laser 203 is reflected from the beam splitter 223, and transmitted through the beam splitter 222. Thereafter, it is converged onto the optical disk 240, as in the case of the light beam of the wavelength $\lambda b$. The light beam having been reflected from the optical disk 240 finally enters the photodetector 209, and is detected as an electrical signal.

Thus, as compared to the optical pickup of Embodiment 1, the optical pickup of the present embodiment is made lightweight as a whole, with the numbers of objective lenses and photodetectors being reduced. However, the transmission line for the driving current used for driving the blue-violet semiconductor laser is shortened, and excellent high-frequency propagation characteristics are secured; that is, similar effects to those of the optical pickup of Embodiment 1 are obtained.

Although the semiconductor lasers 202 and 203 and the photodetector 209 are provided in different packages in the present embodiment, they may be integrated in an integral manner.

INDUSTRIAL APPLICABILITY

An optical pickup according to the present invention is suitably used in an optical disk apparatus which performs data recording/reproduction with three kinds of laser light having different wavelengths.

The invention claimed is:

1. An optical pickup for performing data recording and reproduction by using a plurality of light beams of different wavelengths, comprising:
a first semiconductor laser for emitting a first light beam having a first wavelength;
a second semiconductor laser for emitting a second light beam having a second wavelength which is longer than the first wavelength;
a third semiconductor laser for emitting a third light beam having a third wavelength which is longer than the second wavelength;
at least one objective lens for converging the first, second, and third light beams;
an integrated circuit element for driving the first, second, and third semiconductor lasers based on an external signal, the integrated circuit element being shaped so as to have a rectangular principal face surrounded by four sides, with a plurality of input/output pins being arranged along each side, the plurality of input/output pins including a first pin group connected to the first semiconductor laser, a second pin group connected to the second semiconductor laser, and a third pin group connected to the third semiconductor laser;
a wiring structure including a first transmission line for connecting the first pin group of the integrated circuit element to the first semiconductor laser, a second transmission line for connecting the second pin group to the second semiconductor laser, and a third transmission line for connecting the third pin group to the third semiconductor laser; and
light detection means for generating an electrical signal in response to at least a portion of the first, second, and third light beams reflected from an optical disk, wherein,
of the rectangular principal face of the integrated circuit element, the side along which the first pin group is provided is orthogonal to the side along which the second pin group is provided or to the side along which the third pin group is provided, and the first transmission line is shorter than both of the second and third transmission lines.

2. The optical pickup of claim 1, wherein the integrated circuit element is positioned so as to be closer to the first semiconductor laser than to the second and third semiconductor lasers.

3. The optical pickup of claim 1, wherein the second pin group and third pin group of the integrated circuit element are both provided along one side which is orthogonal to the side along which the first pin group is provided.

4. The optical pickup of claim 1, wherein the integrated circuit element is disposed so that a diagonal of the rectangular principal face is oriented substantially parallel to a traveling direction of the optical pickup.

5. The optical pickup of claim 1, wherein the first, second, and third light beams are blue-violet laser light, red laser light, and infrared laser light, respectively.

6. The optical pickup of claim 1, wherein characteristic impedances of the first, second, and third transmission lines are each prescribed to be a value which is substantially equal to an equivalent serial resistance value of the semiconductor laser connected thereto.

7. The optical pickup of claim 1, comprising:
a flexible cable on which the integrated circuit element is mounted; and
other flexible cables forming the first, second, and third transmission lines, wherein,
the plurality of flexible cables are stacked.

8. An optical disk apparatus comprising: a motor for rotating an optical disk; and an optical pickup for performing data recording and reproduction for the optical disk by using a plurality of light beams of different wavelengths,
the optical pickup including:
a first semiconductor laser for emitting a first light beam having a first wavelength;
a second semiconductor laser for emitting a second light beam having a second wavelength which is longer than the first wavelength;
a third semiconductor laser for emitting a third light beam having a third wavelength which is longer than the second wavelength;
at least one objective lens for converging the first, second, and third light beams;

an integrated circuit element for driving the first, second, and third semiconductor lasers based on an external signal, the integrated circuit element being shaped so as to have a rectangular principal face surrounded by four sides, with a plurality of input/output pins being arranged along each side, the plurality of input/output pins including a first pin group connected to the first semiconductor laser, a second pin group connected to the second semiconductor laser, and a third pin group connected to the third semiconductor laser;

a wiring structure including a first transmission line for connecting the first pin group of the integrated circuit element to the first semiconductor laser, a second transmission line for connecting the second pin group to the second semiconductor laser, and a third transmission line for connecting the third pin group to the third semiconductor laser; and light detection means for generating an electrical signal in response to at least a portion of the first, second, and third light beams reflected from an optical disk, wherein, of the rectangular principal face of the integrated circuit element, the side along which the first pin group is provided is orthogonal to the side along which the second pin group is provided or to the side along which the third pin group is provided, and the first transmission line is shorter than both of the second and third transmission lines.

* * * * *